Sept. 18, 1962 D. E. DAVIDSON 3,054,901
INDEXING INSTRUMENT
Filed Jan. 4, 1960 2 Sheets-Sheet 2
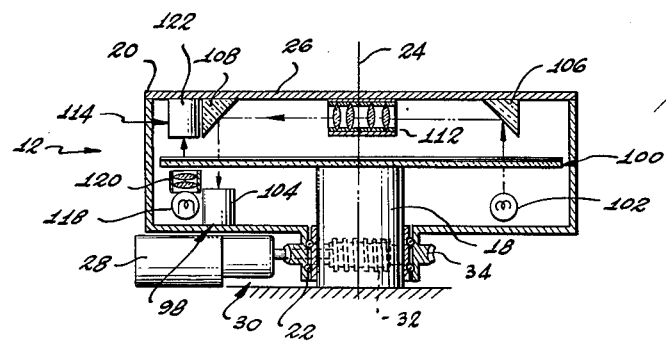
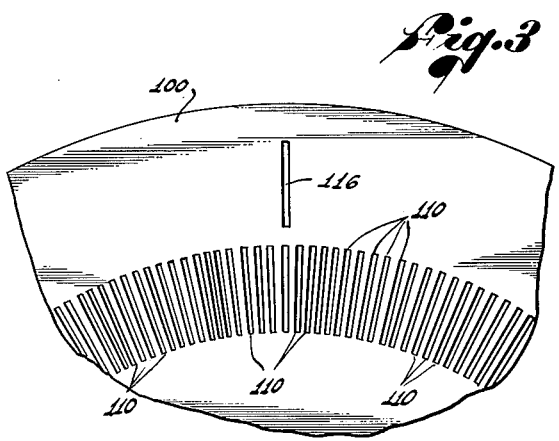
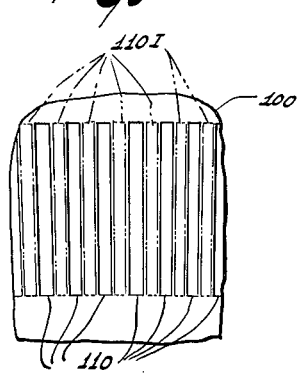
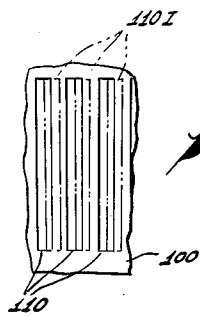
INVENTOR.
DONALD E. DAVIDSON
BY *Lilly & Nyhagen*
*Attorneys*

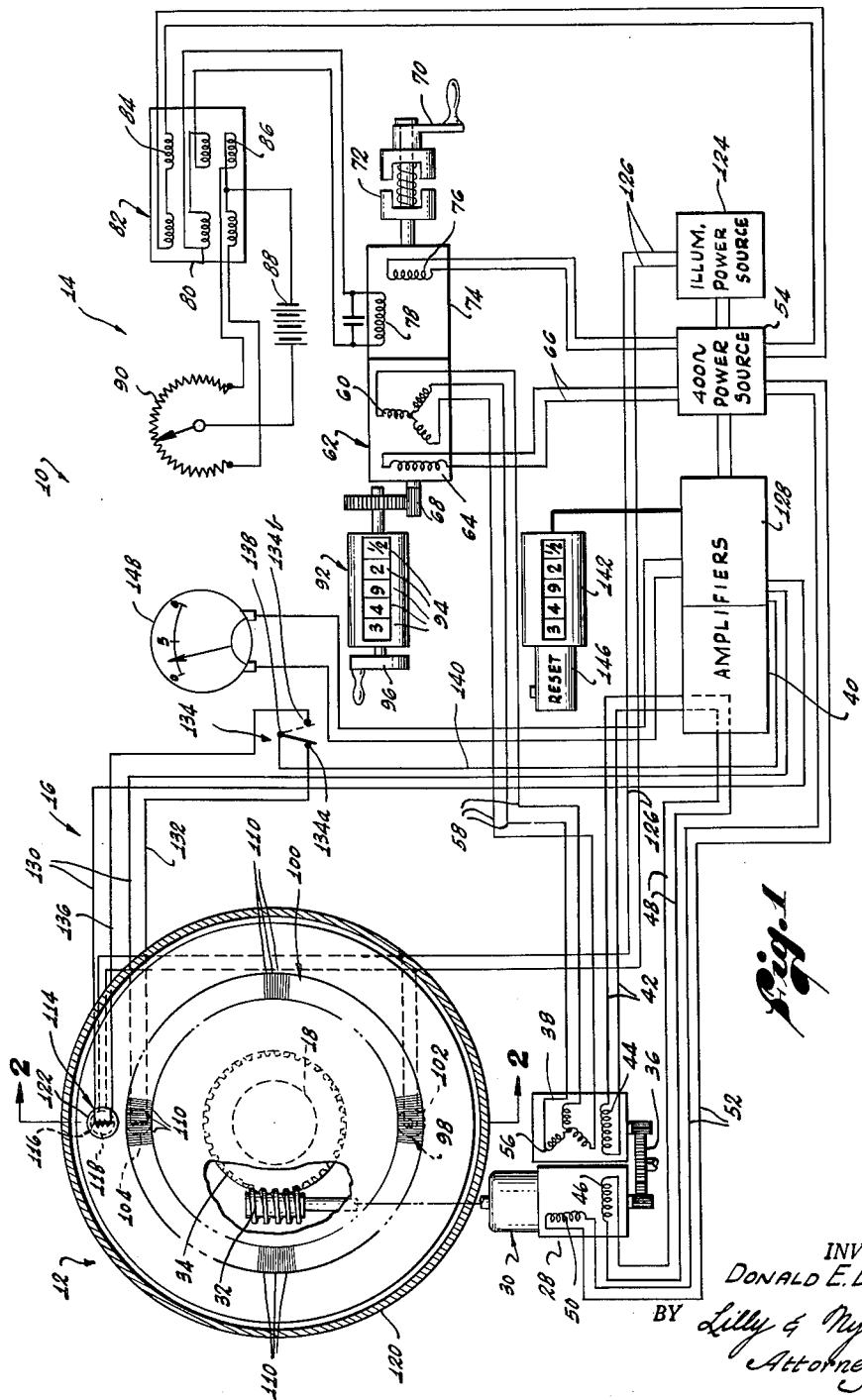

United States Patent Office 3,054,901
Patented Sept. 18, 1962

3,054,901
INDEXING INSTRUMENT
Donald E. Davidson, La Habra, Calif., assignor to Davidson Optronics, Inc., West Covina, Calif., a corporation of California
Filed Jan. 4, 1960, Ser. No. 167
8 Claims. (Cl. 250—233)

This invention deals generally with an indexing instrument and particularly with an electrical, remote control indexing instrument.

Briefly, the invention provides an indexing instrument equipped with a remote slave unit and a gear master or control unit. The slave unit contains a driven part to be indexed to any one of a series of successive predetermined positions, a drive means for moving the part through said positions and a means to accurately sense or detect movement of the part through each position. The control unit contains controls for selectively operating the drive means of the slave unit to move the driven part through its successive positions to any selected position and a position indicating means actuated by the position sensing means of the slave unit for indicating the position occupied by the driven part.

A general object of the invention is to provide an indexing instrument of the character described which enables extremely accurate positioning of the driven part of the slave unit from a remote location.

A highly important object of the invention is to provide a unique photoelectric position sensing means for an indexing instrument of the character described which permits the position of the driven part to be detected and indicated at the distant control unit with a high degree of accuracy.

Another highly important object of the invention is to provide a photoelectric position sensing means according to the previous object which is especially suited for use with a rotary indexing instrument.

A further object of the invention is to provide an indexing instrument of the character described which is ideally suited to remote, accurate positioning of an optical element.

The invention possesses numerous other objects, advantages and features which will be evident from the following detailed description taken in connection with the attached drawings, wherein:

FIG. 1 diagrammatically illustrates the present indexing instrument;

FIG. 2 is a section through the remote slave unit of the instrument;

FIG. 3 is an enlarged detail of a light shutter which forms a part of a photoelectric position sensing means embodied in the slave unit;

FIG. 4 is a further enlarged view of a portion of the shutter in FIG. 3 showing certain slits in the shutter and slit images which are produced on the shutter during operation of the instrument;

FIG. 5 is a view similar to FIG. 4 showing the slits and slit images in another position; and FIG. 6 illustrates a series of electrical indexing impulses which are generated by the slave unit as it rotates.

In these drawings, the remote slave unit of the indexing instrument 10 is designated by the numeral 12 and the near master or control unit is designated by the numeral 14. These units are electrically coupled by wires 16 which may be formed into a cable of any desired length to enable the slave unit to be located at any selected remote position.

As may be best observed in FIG. 2, the slave unit 12 includes a stationary part or base 18 and a movable part 20 to be indexed. This movable part is shown as comprising a hollow, cylindrical turntable which is rotatably supported, by a bearing 22, on the stationary base 18 for turning on a vertical axis 24. The turntable 20 has a flat upper surface 26 ot support a part, such as a prism or mirror, to be angularly positioned by means of the present indexing instrument. Turntable 20 is driven in rotation from a servomotor 28 through reduction gearing 30 including a worm 32 on the base 18 meshing with a worm wheel 34 on the turntable 20. The shaft of the servomotor 28 is coupled by gearing 26, having a 1:1 ratio, to the rotor of a control transformer 38 within the slave unit.

The servomotor 28 and control transformer 38 form part of a conventional servomechanism for selectively driving the turntable 20 from the control unit 14. The remainder of this servomechanism is contained within the control unit 14 and will now be described.

Indicated at 40 is a servo amplifier, the input of which is connected via leads 42 to the rotor winding 44 of the control transformer 38. The output of the servo amplifier 40 is connected to the rotor winding 46 of the servomotor 28 through leads 48. The stator winding 50 of the servomotor 28 is energized through leads 52 from an A.C. power source 54, such as a 400 cycle power source, within the control unit 14. The stator windings 56 of the control transformer 38 are connected, through leads 58, with the stator windings 60 of a control transmitter 62 within the control unit 14. The rotor winding 64 of this control transmitter is connected to the power source 54 through leads 66.

This servomechanism is conventional in every respect and operates in the well-known way to maintain a predetermined angular relationship between the shaft 68 of the control transmitter 62 and the shaft of the servomotor 28. Thus, the turntable 20 of the slave unit may be selectively driven in rotation from one position to another from the control unit 14 by appropriate turning of the control transmitter shaft 68.

The shaft 68 of the control transmitter carries a handle 70 by which it may be manually turned. This handle or crank 70 is releasably connected to the control transmitter shaft 68 through a clutch 72 and provides a fine drive for the turntable of the slave unit. A high-speed drive for the turntable is furnished by a motor 74 which is coupled to the shaft 68 of the control transmitter. This motor includes a rotor winding 76 which is energized from the A.C. power source 54 and a stator winding 78 which is connected to the secondary winding 80 of a saturable reactor 82. The primary winding 84 of this reactor is connected to the A.C. power source 54. The control winding 86 of the reactor is energized from a battery 88 through a rheostat 90 which may be turned in one direction from its central neutral position to cause operation of motor 74 in one direction and in the opposite direction from its neutral position to reverse the motor.

Thus far, I have described the selectively operable drive means embodied in the present instrument for selectively positioning the driven part or turntable 20 from the control unit 14. The present invention is primarily concerned with the remainder of the instrument which provides a means for sensing the angular position of the turntable and displaying this position at the control unit 14.

One position indicating means for this purpose is provided by a mechanical counter 92 which is operatively connected to the shaft 68 of the control transmitter. This counter is of conventional design and includes a series of wheels 94 which are actuated in the well-known way to indicate a count for each revolution of the control transmitter shaft 68. The calibration of the counter wheels and the ratio of the gearing 30 are such that the wheels display the current angular position of the turntable 20 to tenths of a degree of arc. The mechanical counter has a manual reset means 96 for resetting the counter reading to zero or any desired reading.

The indexing instrument embodies a second photoelectric positioning sensing and indicating means which will now be described. The photoelectric position sensing means is embodied in the slave unit 12 and comprises a photoelectric device 98 and a shutter device 100 which are carried, respectively, by the turntable 20 and stationary base 18 of the slave unit so as to be relatively rotated when the turntable 20 turns. The photoelectric device 98 is illustratively carried on the turntable 20 and comprises a light source 102, such as a neon lamp, and a photoelectric receiver such as a photocell 104 at diametrically opposite sides of and spaced the same radial distance from the turning axis 24 of the turntable. The lamp and photocell are both located at the underside of the shutter 100. Mounted on the turntable at the upper side of the shutter are a pair of prisms 106 and 108 which are located directly over the lamp and photocell, respectively, so as to reflect light rays from the lamp incident on the prism 106 diametrically across the shutter and then downwardly to the photocell 104.

The shutter 100 comprises an opaque disc formed with a circular row of transparent, radial index lines or slits 110. These lines or slits may be made in various ways. For example, the shutter 100 may comprise a transparent disc having an opaque film which is accurately scribed or engraved to form the transparent lines or slits 110. The angular spacing between these slits is dependent on the desired accuracy of the instrument and may be on the order of one tenth of a degree of arc, for example.

The circular row of slits 110 is centered on the turning axis 24 of the turntable. Also, these slits have the same radial spacing from the axis as the lamp 102 and photocell 104. Accordingly, during rotation of the turntable, the slits 110 move between the lamp 102 and its adjacent prism 106 and also between the photocell 104 and its adjacent prism 108. The slits at the right-hand side of the disc in FIG. 2, of course, are illuminated from below by the lamp 102 during movement between the lamp and prism 106. Mounted on the turntable between the prisms 106 and 108 is a lens system 112 for producing images 110I (FIGS. 4 and 5) of these illuminated right-hand slits on the left-hand side of the shutter disc, as the latter is viewed in FIG. 2. The row of slit images 110I is superimposed on the row of slits 110 at the left-hand side of the disc.

It is evident that during rotation of the turntable 20, relative rotational motion occurs between the photocell 104 and the rows of slits 110 and slit images 110I on the left-hand part of the disc in FIG. 2 which overlies the photocell. It is further evident that the relative rotational motion between the photocell and row of slits 110 occurs in one direction while the relative rotational motion between the photocell and row of slit images 110I occurs in the opposite direction. Accordingly, there is a relative rotational movement between the row of slit images 110I and the row of slits 110.

This obviously results in a relative motion of the slit images 110I and slits 110 across one another on the portion of the shutter disc overlying the photocell. Since the angular spacing between the slit images is exactly the same as the angular spacing between the slits, the slit images are exactly superimposed on the slits in certain predetermined angular positions of the turntable. These predetermined positions are hereinafter referred to as index positions. In other positions of the turntable, the slit images are offset from the slits, as shown in FIGS. 4 and 5, for example. A little thought will show that the angles between the successive index positions of the turntable, in which the slit images and slits are exactly coincident, are the same and equal to the angle between adjacent slits 110.

The intensity of light incident on the photocell 104 from the lamp 102 is maximum when the slits and slit images are exactly coincident in the aforesaid index positions of the turntable. When the turntable is rotated in either direction from any one of these index positions, the slits and slit images become misaligned and the intensity of the incident light on the photocell decreases until the passage of light to the photocell is blocked completely by total misalignment of the slits and slit images, as in FIG. 4.

From this discussion, it is evident that the photoelectric device 98 and shutter device 100 provide a means for generating an electrical impulse in response to rotation of the turntable through each of its aforesaid index positions and, therefore, also a means to sense or detect rotation of the turntable to each of these positions. The turntable may thus be rotated or indexed to any selected index position simply by establishing a zero index position of the turntable and counting the electrical impulses generated during rotation of the turntable from this zero position, as will be presently more fully discussed.

The zero position of the turntable is established by a second photoelectric zeroizing device 114 which utilizes a zeroizing line or slit 116 on the shutter plate 100. This zeroizing line is offset from the circular row of index slits 110, as shown. The photoelectric zeroizing device comprises a lamp 118 carried on the turntable at one side of the shutter plate 100 and at the same radial distance from the turning axis 24 of the turntable as the zeroizing slit 116. Mounted on the turntable between this lamp and the shutter plate are lenses 120 for focusing a narrow beam of light, having a width approximately equal to the width of the zeroizing slit 116, onto the shutter plate 100. Mounted on the turntable at the remote side of the shutter plate 100 and in the path of this beam is a photocell 122.

From this discussion, it is evident that the shutter plate 100 intercepts the beam of light from the lamp 118 except when the zeroizing slit 116 is aligned with the beam. This alignment of the zeroizing slit with the light beam of the photoelectric zeroizing device 114 is set to occur in one index position of the turntable, hereinafter referred to as its zero index position.

Lamp 102 of the photoelectric indexing device 98 and lamp 118 of the photoelectric zeroizing device 118 are energized from a separate illumination power source 124 contained in the control unit 14 through leads 126. Also embodied in the control unit is an amplifier 128 for amplifying the electrical outputs from the indexing photocell 104 and the zeroizing photocell 122. The photocells are connected to the input of this amplifier as follows:

One terminal of the indexing photocell 104 and one terminal of the zeroizing photocell 122 are connected to an input terminal of the amplifier 128 through leads 130. Extending from the other terminal of the indexing photocell 104 is a lead 132 which connects to one contact 134a of a two-position selector switch 134. A lead 136 connects the other terminal of the zeroizing photocell 122 to the other contact 134b of this selector switch. The blade terminal 138 of the selector switch is connected through a lead 140 to an input terminal of the amplifier 128. From this discussion, it is evident that the output of the indexing photocell 104 may be fed to the amplifier 128 by closing the contacts 134a of the selector switch 134. The output of the zeroizing photocell 122 may be fed to the amplifier 128 by closing the other contacts 134b of the selector switch.

As already mentioned, during rotation of the turntable 20, the photoelectric indexing device consisting of the photoelectric device 98 and shutter device 100 generates a series of electrical impulses. FIG. 6 illustrates these impulses. When the selector switch 134 is in its indexing mode wherein its contacts 134a are closed, these impulses are fed to the amplifier 128. The amplified impulses actuate an electronic counter 142 connected to the output of the amplifier 128. This counter is calibrated like counter 92 to indicate the current index position occupied by the turntable 20. Reset means 146 are provided for resetting the counter 142 to any desired reading.

It will be recalled that during rotation of the turntable 20, the light incident on the indexing photocell 104 increases to a maximum and then drops off as the table turns through each of its index positions, the maximum incident light condition occurring when the turntable is exactly in one of its index positions. In order to detect this maximum light condition, the amplified output from the amplifier 128 also feeds a maximum indicating meter 148. This meter indicates a maximum reading when the electrical output from the indexing photocell, or from the zeroizing photocell in the zeroizing mode of the instrument, reaches a maximum.

In operation of the instrument, the selector switch 134 is first set in its zeroizing mode wherein the contacts 134b are closed. The turntable is then rotated, either by operation of the handle 70 or high-speed turntable control 90, until the meter 148 registers a reading. This, of course, indicates that the zeroizing slit is approximately aligned with the beam from the zeroizing lamp 118 and the turntable is approximately in its zero position. The turntable is then accurately located in its zero position by turning the manual turntable drive handle 70 back and forth slowly until meter 148 indicates a maximum reading. The manual counter 92 and the electronic counter 142 are now set to indicate a zero reading. It may be of, course, that the photoelectric zeroizing device may not be actually coincident with the zero position of the turntable but rather spaced some predetermined angle from the zero position. In this case, the counters would be reset to indicate a predetermined reading corresponding to the angular deviation between the position of the photoelectric zeroizing device and the zero position of the turntable.

The selector switch 134 is now shifted to its indexing mode wherein the switch contacts 134a are closed. The turntable is now rotated in one direction or the other toward a desired angular position. The drive for the manual counter 92 is geared so that the counter will indicate the proper current index position of the turntable as the latter rotates. The electronic counter 142, of course, is actuated by each impulse generated by the photoelectric indexing means 98, 100, in response to rotation of the turntable through each successive index position. Where the index slits or lines 110 on the shutter plate 100 are spaced by one tenth of a degree of arc, for example, the manual counter 92 and electronic counter 142 will bear indicia for indicating the angular position of the turntable to one tenth of a degree of arc. When the turntable has been rotated to an approximate index position, it is accurately aligned with this index position by rotating the table back and forth until the meter 148 indicates a maximum reading.

It is evident, therefore, that the indexing instrument herein disclosed is fully capable of attaining the objects and advantages preliminarily set forth.

Numerous modifications in the design, arrangement of parts and instrumentalities of the invention are possible within the scope of the following claims.

What is claimed is:

1. In a rotary indexing instrument including a stationary part and a rotary part to be indexed mounted on said stationary part for rotation on a given axis, the improvements comprising an opaque shutter mounted on one of said parts in a plane approximately normal to said axis and having a circular row of radial light permeable indexing slits approximately centered on said axis, a lamp and a photosensitive receiver mounted on the other part at one side of the shutter in positions opposite and spaced along said row, whereby said shutter and said lamp and receiver undergo relative rotation during rotation of said rotary part on said stationary part, and optical means including a lens system mounted on said other part at the other side of the shutter for producing on the adjacent side of the shutter over said row and opposite said receiver images of those slits located opposite and illuminated by said lamp, which images are approximately equal in size to said slits and undergo rotational movement along said row in a direction opposing the direction of relative rotation of said shutter with respect to said receiver.

2. The subject matter of claim 1 wherein said receiver is located approximately diametrically across said row from said lamp and said optical means comprises a reflector opposite said lamp, a reflector opposite said receiver, and a lens system between the reflectors arranged so that light from the illuminated slits opposite the lamp is reflected through the lens means to the second reflector and then back toward said row and said lens system including lenses for producing said images.

3. In a rotary indexing instrument including a stationary part and a rotary part to be indexed rotatably mounted on the stationary part for turning on a given axis, the improvements comprising an opaque shutter mounted on the stationary part in a plane approximately normal to said axis and having a circular row of radial light permeable indexing slits approximately centered on said axis, a lamp and a photosensitive receiver mounted on said rotary part at one side of said shutter in positions opposite and spaced along said row, said lamp and receiver undergoing rotational movement along said row during rotation of said rotary part, and optical means mounted on said rotary part at the other side of said shutter for producing on the adjacent side of the shutter over said row and opposite said receiver images of those slits located opposite and illuminated by said lamp, which images are approximately equal in size to said slits and undergo rotational movement along said row in a direction opposing the direction of rotation of said receiver.

4. The subject matter of claim 3 wherein said receiver is located approximately diametrically across said row from said lamp and said optical means comprises a reflector opposite said lamp, a reflector opposite said receiver, and a lens system between the reflectors arranged so that light from the illuminated slits opposite the lamp is reflected through the lens means to the second reflector and then back toward said row and said lens system including lenses for producing said images.

5. A rotary indexing instrument comprising a stationary part and a rotary part to be indexed rotatably mounted on the stationary part, means operatively connected with said rotary part for generating an electrical impulse in response to rotation of said rotary part through each of a series of predetermined angular positions, an electrical counter electrically coupled to said generating means for counting the electrical impulses generated by said generating means and displaying the total impulse count, and a revolution counter operatively coupled to and actuated by rotation of said rotary part for registering a count in response to rotation of said rotary part through each of said positions and displaying the total number of counts registered by the latter counter.

6. In a rotary indexing instrument including a stationary part and a rotary part to be indexed mounted on said stationary part for rotation on a given axis, the improvements comprising an opaque shutter mounted on one of said parts in a plane approximately normal to said axis and having a circular row of radial light permeable indexing slits approximately centered on said axis, a lamp and a photosensitive receiver mounted on the other part at one side of the shutter in positions opposite and spaced along said row, whereby said shutter and said lamp and receiver undergo relative rotation during rotation of said rotary part on said stationary part, optical means mounted on said other part at the other side of the shutter for producing on the adjacent side of the shutter over said row and opposite said receiver images of those slits located opposite and illuminated by said lamp, which images are approximately equal in size to said slits and undergo rotational movement along said row in a direction opposing the direction of relative rotation of said shutter with respect to said receiver, and an indicating meter electrically coupled to said receiver for indicating the output of the receiver, whereby to enable said rotary part to be adjusted to a position wherein said images are accurately aligned with the adjacent slits as indicated by a maximum reading on said meter.

7. In a rotary indexing instrument including a stationary part and a rotary part to be indexed mounted on said stationary part for rotation on a given axis, the improvements comprising an opaque shutter mounted on one of said parts in a plane approximately normal to said axis and having a circular row of radial light permeable indexing slits approximately centered on said axis, a lamp and a photosensitive receiver mounted on the other part at one side of the shutter in positions opposite and spaced along said row, whereby said shutter and said lamp and receiver undergo relative rotation during rotation of said rotary part on said stationary part, optical means mounted on said other part at the other side of the shutter for producing on said other side of the shutter over said row opposite said receiver images of those slits located opposite and illuminated by said lamp, which images are approximately equal in size to said slits and undergo rotational movement along said row in a direction opposing the direction of relative rotation of said shutter with respect to said receiver, said shutter having a single radial light permeable indexing slit offset from said row, a lamp mounted on said other part at one side of said shutter and at the same radial distance from said axis as said single area, and a light sensitive receiver mounted on said other part at the other side of said shutter from and in a position opposite the latter lamp.

8. In a rotary indexing instrument, the combination of an upright base, a hollow cylindrical turntable rotatably mounted on said base for turning on its central axis, one end of said base extending to the inside of said turntable, an opaque shutter fixed on said one end of said base and located approximately midway between the ends of the turntable in a plane approximately normal to said axis, said shutter having a circular row of radial light permeable indexing slits approximately centered on said axis, a lamp and a photosensitive receiver mounted on the inside of said turntable at one side of said shutter in positions opposite said row and approximately diametrically across said row from one another, a pair of reflectors mounted within said turntable at the other side of said shutter opposite said lamp and receiver, respectively, and a lens system mounted within said turntable between said reflectors, the reflector opposite the lamp being inclined to reflect light from those slits located between the lamp and latter reflector through said lens system to the other reflector and the latter reflector being inclined to reflect the light back toward said row opposite the receiver, said lens system including lenses for producing images of said illuminated slits on the adjacent side of the shutter over said row and opposite said receiver, which images are approximately equal in size to said slits and undergo rotational movement along said row in a direction opposing the direction of rotation of said receiver along the row during rotation of said turntable.

References Cited in the file of this patent
UNITED STATES PATENTS

| | | |
|---|---|---|
| 2,514,284 | Le Page | July 4, 1950 |
| 2,680,241 | Gridley | June 1, 1954 |
| 2,784,397 | Branson | Mar. 5, 1957 |
| 2,788,519 | Caldwell | Apr. 9, 1957 |
| 2,891,239 | Parsons | June 16, 1959 |